United States Patent [19]

Adams

[11] Patent Number: 4,557,440
[45] Date of Patent: Dec. 10, 1985

[54] MOVABLE PANEL WITH COMPOUND CURVATURE AND METHOD OF MAKING SAME

[75] Inventor: Ronald Adams, Edmonds, Wash.
[73] Assignee: The Boeing Company, Seattle, Wash.
[21] Appl. No.: 524,335
[22] Filed: Aug. 18, 1983
[51] Int. Cl.[4] .............................................. B64C 1/14
[52] U.S. Cl. ................................................ 244/129.4
[58] Field of Search ............... 244/117 R, 119, 129.5, 244/129.4; 52/807, 817, 818; 29/446, 449, 448

[56] References Cited

U.S. PATENT DOCUMENTS 2,457,625 12/1948 Amiot ............................... 244/129.5

FOREIGN PATENT DOCUMENTS 203927 2/1955 Australia ............................... 29/449

*Primary Examiner*—Galen L. Barefoot
*Attorney, Agent, or Firm*—Joan H. Pauly

[57] ABSTRACT

A plurality of lateral beams (28) are spaced along a center reference line. This line is preferably a mean contour between the curvatures at the lateral edges of panel (6). The longitudinal axes of beams (28) are oriented at a constant angle, preferably 90°, to the line. The ends of beams (28) are essentially identical. Two edge members (14, 16) have mating surfaces with essentially constant cross-sectional shapes and longitudinal axes that conform to the curvatures at said lateral edges. Members (14, 16) are twisted about their respective longitudinal axes to bring said mating surfaces into engagement with the ends of beams (28). The reference line may be located slightly inboard of the operational compound curvature of the panel (6) to give the panel (6) a modified, flattened contour. In such case, panel (6) is sufficiently flexible to bow to conform to said curvature when the inboard side of panel (6) is pressurized.

31 Claims, 19 Drawing Figures

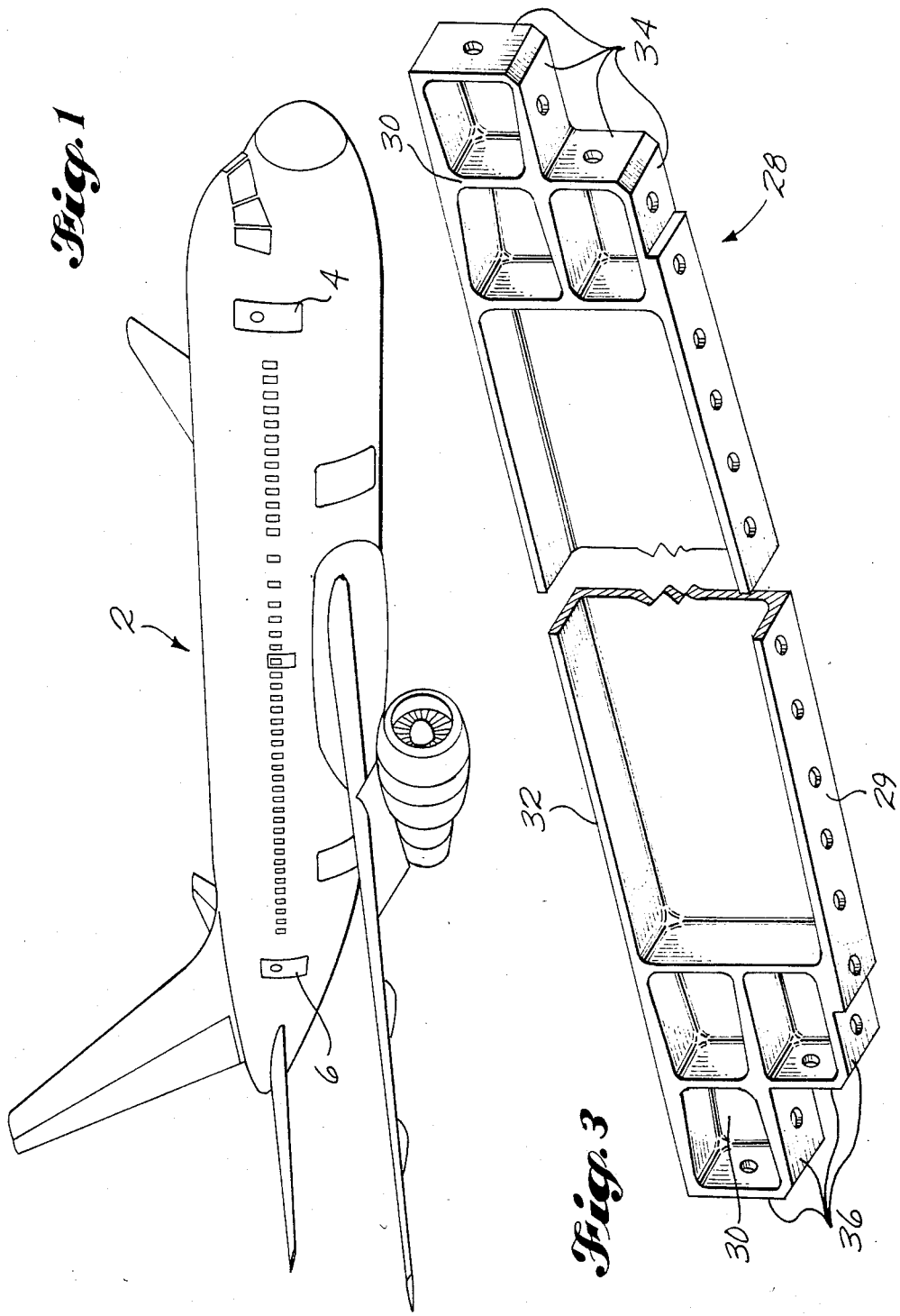

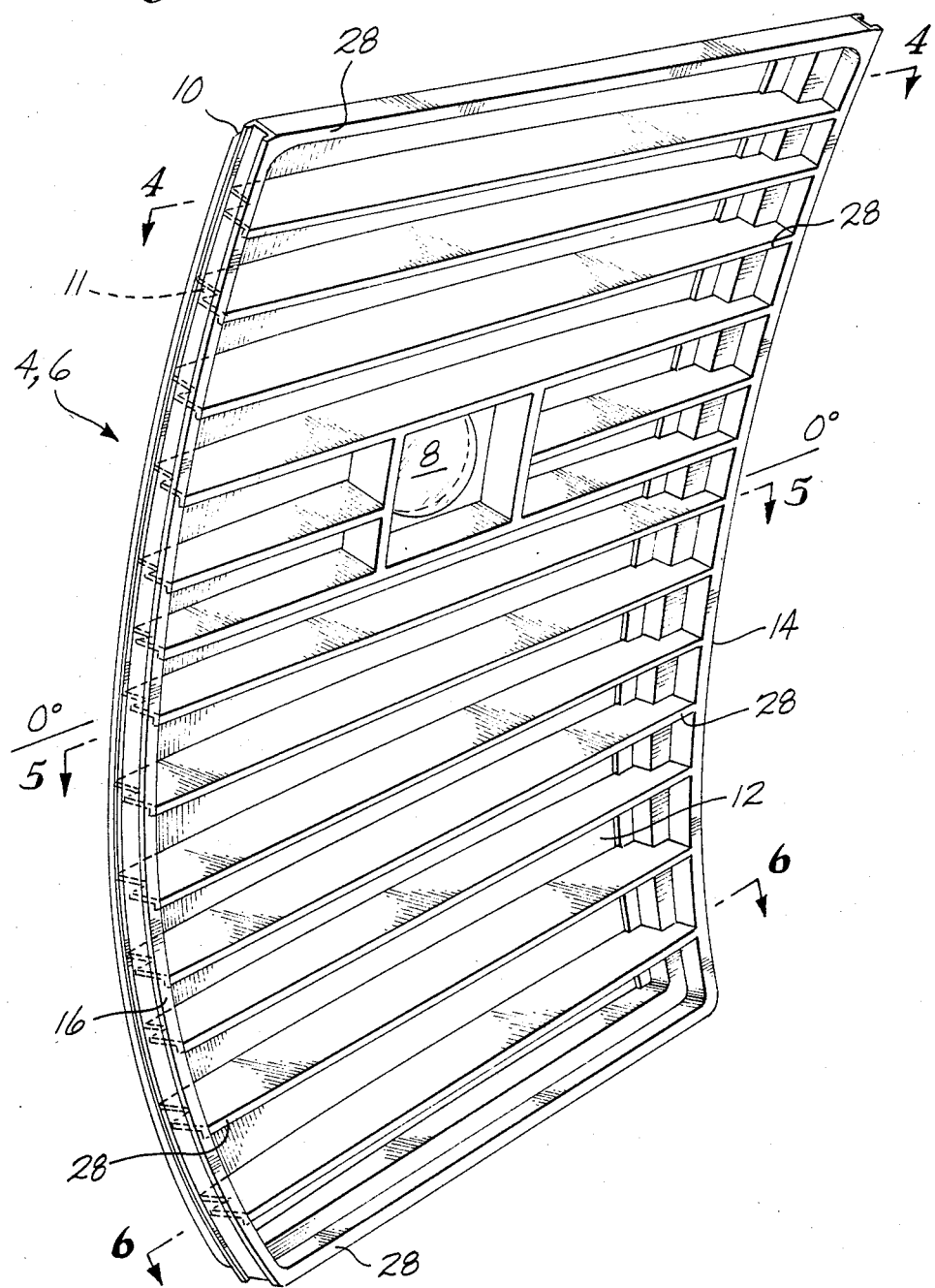

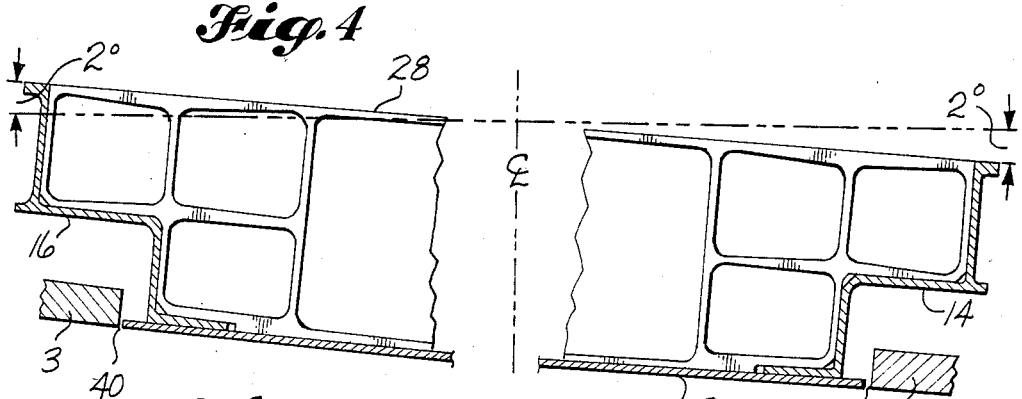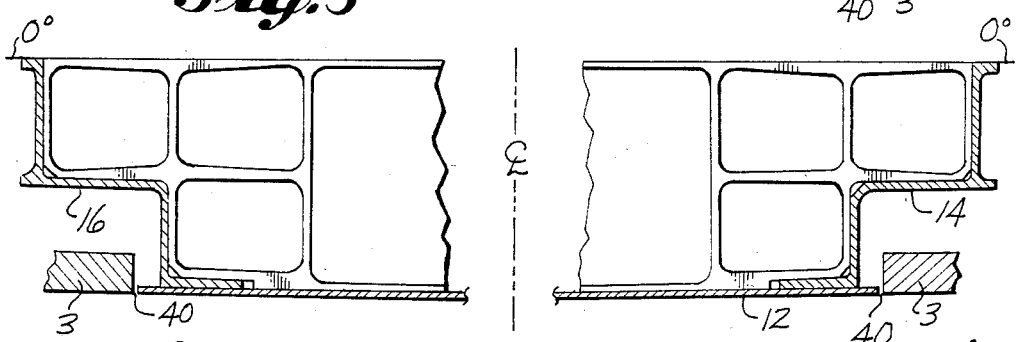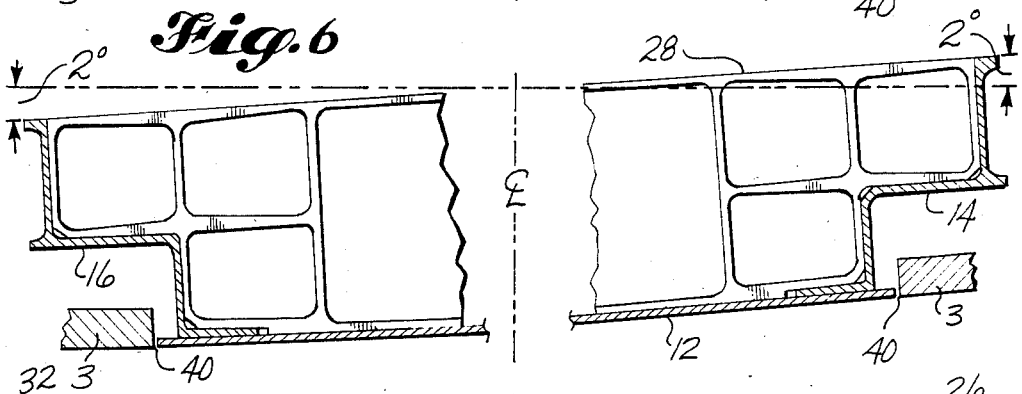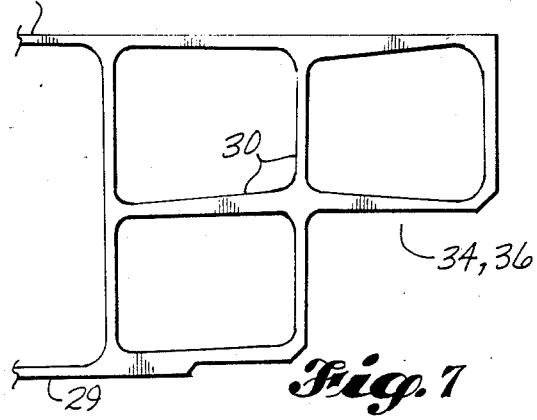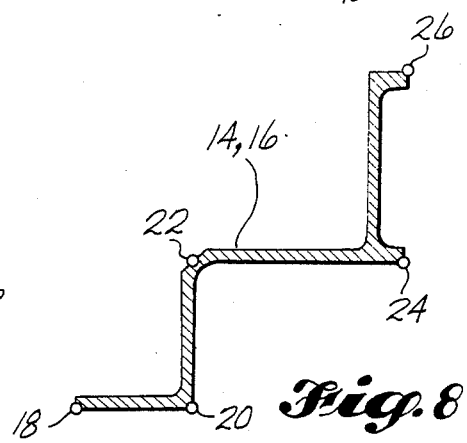

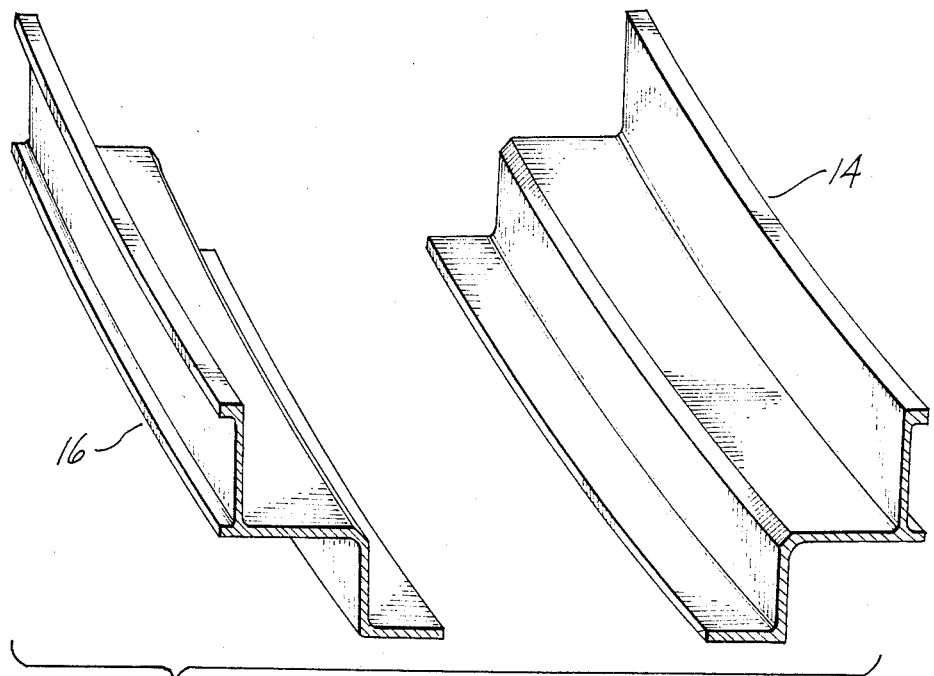
Fig. 9
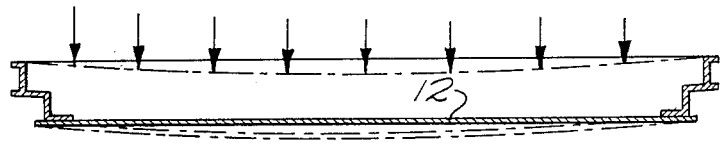
Fig. 15
Fig. 16 PRIOR ART
Fig. 17 PRIOR ART
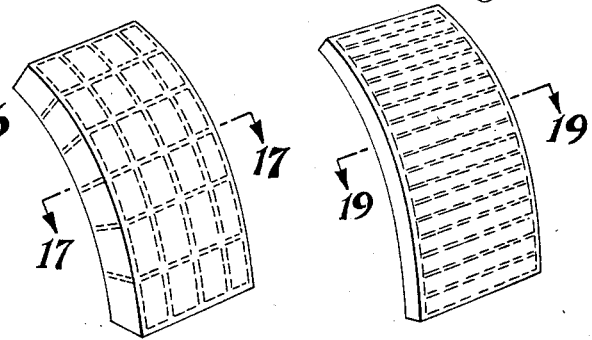
Fig. 18
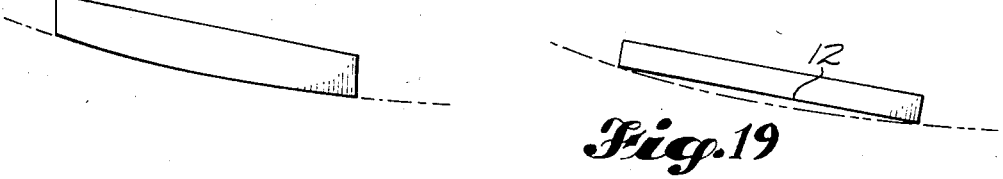
Fig. 19

MOVABLE PANEL WITH COMPOUND CURVATURE AND METHOD OF MAKING SAME

DESCRIPTION

1. Technical Field

This invention relates to movable panels with compound curvatures and to methods of making such panels and, more particularly, to such a panel and method in which a high degree of uniformity of transverse beams and a modified contour simplify manufacture and provide a more compact structure.

2. Background Art

In commercial jet aircraft, entry and service doors are generally located in the forward and aft areas of the fuselage. As is well known, these areas of the fuselage in such aircraft have contours with compound curvatures. In other words, the outer surface of the fuselage has one curvature in a generally horizontal direction and another curvature in a generally vertical direction. This compound or double curvature greatly complicates the design of door structures in these fuselage areas. In order to maintain the aerodynamic characteristics of the aircraft, the door must of course conform to the curvature of the fuselage. The edges of the door must be curved to conform to the curvature of the edges of the opening in the fuselage into which the door is installed. Therefore, along the edges of the door there are changing angles and contours.

The conventional structural arrangement for such doors starts with vertical edge members that follow station lines of the aircraft located at the vertical edges of the opening for the door. These vertical edge members support a series of radial, generally horizontal, beams to carry pressure loads. Each of the radial beams intersects the edge members at a different angle and, therefore, each of the beams is necessarily different. This greatly complicates and increases the cost of manufacture. Each of the beams is a separate and different part and a relatively large number of different angles on the different beams must be machined. Moreover, when essentially identical doors are located on either side of the aircraft there is no commonality between the beams in the opposite doors and therefore the cost of manufacture is further increased.

As noted above, each door must conform to the curvature of the fuselage to maintain the aerodynamic characteristics of the aircraft. In order to attain the desired conformity, conventional cabin doors are fabricated with the desired operational curvature and with a high degree of rigidity. This rigidity is necessary because any deflections of the door due to the pressurization of the cabin will create an out-of-contour condition during operation of the aircraft when skin smoothness is critical. The required rigidity is attained by providing the door structure with stiffening members that increase the overall thickness of the door. The increased thickness has a number of disadvantages. The door occupies a relatively large amount of valuable and otherwise usuable cabin space. In addition, the choice of the manner of opening the door is restricted since the increased thickness must be accommodated.

DISCLOSURE OF THE INVENTION

A subject of this invention is a movable panel for use in a wall of an aircraft, said wall having an outer surface with a compound curvature. According to an aspect of the invention, the panel comprises right edge member means, left edge member means, and a plurality of spaced-apart lateral beams. The right edge member means has a longitudinal axis that conforms to said curvature along the right edge of the panel and includes right mating surface means with an essentially constant cross-sectional shape. The left edge member means has a longitudinal axis that conforms to said curvature along the left edge of the panel and includes left mating surface means with an essentially constant cross-sectional shape. Each of the beams has a right end portion, a left end portion, and a center portion. Means are provided for securing each right end portion to the right edge member means and each left end portion to the left edge member means. Each of the right end portions is essentially identical, and each of the left end portions is essentially identical. Each of the center portions is oriented at a substantially constant predetermined angle with respect to a center line located substantially midway between said right and left edge member means. The right and left edge member means are twisted about their respective longitudinal axis to bring the right and left mating surface means into mating engagement with each of the right and left end portions, respectively. Preferably, the center line is a mean contour interpolated from the longitudinal axis of said right and left edge member means. Also preferably, the beams are substantially symmetrical about said center line. The preferred value of said predetermined angle is substantially equal to 90°.

According to another aspect of the invention, the laterally extending longitudinal axis of each beam is substantially perpendicular to a side portion of each mating surface means. This side portion is in mating engagement with the corresponding end portion of such beam.

According to a preferred aspect of the invention, the right mating surface means comprises a continuous stop surface that matingly engages each of the right end portions of the beams. The left mating surface means comprises a continuous stop surface that matingly engages each of the left end portions of the beams.

A preferred feature of the invention is the provision of each of the right and left mating surface means with a cross-sectional shape having a stepped configuration. The stepped configuration of the right mating surface means mates with a corresponding stepped configuration of each of said right end portions. The stepped configuration of the left mating surface means mates with a corresponding stepped configuration of each of said left end portions. Preferably, the beams are substantially symmetrical about said center line and the stepped configuration of said end portions has portions essentially parallel to the longitudinal axis of the corresponding beam and portions essentially perpendicular to said axis of said beam.

According to still another aspect of the invention, the center line is positioned slightly inboard of said compound curvature to give the panel a modified, flattened outboard contour with respect to said compound curvature. The beams are sufficiently flexible so that a higher pressure on the inboard side of the panel than on the outboard side of the panel tends to bow the panel to conform said outboard contour to said compound curvature. Preferably, the center line is a mean contour interpolated from the longitudinal axes of said right and left edge member means. Also preferably, each of the right and left mating surfaces comprises a continuous stop surface.

According to yet another aspect of the invention, the panel further comprises an outer skin to which an outboard surface of each beam is adjacent and attached. The center line is positioned slightly inboard of said compound curvature to give the panel a modified flattened contour with respect to said compound curvatue. The beams and the outer skin are sufficiently flexible so that a higher pressure on the inboard beam side of the outer skin than on the opposite side of the skin tends to bow each beam and the outer skin to conform said skin and said outboard surfaces of the beams to said compound curvature. If possible, it is preferable that said outboard surfaces of the beams be essentially flat when the pressures on the beam side and the opposite side of the outer skin are substantially equal. This feature reduces the cost of manufacture by eliminating the need for a curved outboard surface on each beam to engage a curved outer skin. The flat surfaces are of course cheaper to manufacture than a number of curved surfaces. This feature may be incorporated when the amount of curvature of said compound curvature is sufficiently small to make it practical to allow a flat surface to bow to conform to said curvature.

According to an important aspect of the invention, the panel comprises right edge member means, left edge member means, and a plurality of spaced-apart lateral beams. The longitudinal axis of the right edge member means conforms to said compound curvature along the right edge of the panel. The longitudinal axis of the left edge member means conforms to said curvature along the left edge of the panel. Each of the beams has a right end portion, a left end portion, and a center portion. Means are provided for securing each right end portion to the right edge member means and each left end portion to the left edge member means. Each of the center portions is oriented at a substantially constant predetermined angle with respect to a center line located substantially midway between said right and left edge member means. The center line is positioned slightly inboard of said compound curvature to give the panel a modified, flattened outboard contour with respect to said compound curvature. The beams are sufficiently flexible so that a higher pressure on the inboard side of the panel than on the outboard side of the panel tends to bow the panel to conform said outboard contour to said compound curvature. Preferably, the center line is a mean contour interpolated from the longitudinal axes of said right and left edge member means. Also preferably, the right and left edge member means each includes a continuous stop surface that matingly engages each of said right and left end portions, respectively. The preferred value for said predetermined angle is substantially equal to 90 degrees. When possible, it is preferable to provide each beam with an essentially flat outboard surface that is adjacent to and attached to an outer skin of the panel.

Another subject of the invention is a method of making a movable panel to be installed in an opening in a wall of an aircraft, which wall has a compound curvature. According to an aspect of the invention, the method comprises selecting a center reference line. A plurality of beams with substantially identical end portions are positioned in a spaced-apart relation along reference line and their longitudinal axes are oriented to form a substantially constant angle with the reference line. Edge members are formed to have mating surfaces with substantially constant cross-sectional shapes and to have longitudinal axes that conform to said compound curvature along the lateral edges of said opening. These edge members are twisted about their respective longitudinal axes to cause the mating surfaces to matingly engage opposite end portions of each of the beams. The opposite end portions of the beams are secured to the edge members. Preferably, selecting the center reference line includes interpolating a mean contour from the curvatures at the lateral edges of said opening. Also preferably, the longitudinal axes of the beams are oriented to be substantially perpendicular to the reference line.

According to another method aspect of the invention, the step of selecting a center reference line includes positioning said line slightly inboard of said compound curvature to give the panel a modified, flattened outboard contour with respect to said compound curvature. The method further comprises allowing the beams to deflect an amount sufficient to bow the panel to conform said outboard contour to said compound curvature when there is a higher pressure on the inboard side of the panel than on the outboard side of the panel.

The method of the present invention provides a means for greatly reducing the complexity and cost of manufacturing doors for installation in an aircraft in parts of the fuselage having a compound curvature. Since each of the beams has substantially identical end portions, many of the beams may be essentially identical and the number of parts is significantly reduced. In most cases, all of the beams may be generally alike, with only minor modifications on some of the beams to accommodate attachments for other structures, openings for windows, and the like. The method also lends itself to the use of beams with most if not all plane surfaces and right angles. Beams with such a configuration are relatively easy and inexpensive to manufacture. The overall cost of designing and manufacturing the door for each aircraft is greatly reduced while maintaining the structural integrity of the door.

Panels constructed according to the invention have the advantage of being relatively inexpensive due to the decreased cost of manufacture. In addition, when such a panel has the preferred feature of beams with a substantially symmetrical configuration, even greater cost savings are possible because the beams may be used in either of two doors on opposite sides of an aircraft. Thus, the total number of parts for the two doors is significantly decreased.

Still another advantage of panels which are constructed in accordance with the invention and which have the preferred feature of continuous stop surfaces is that the beams in such panels may be positioned without regard to the locations of horizontal structural members in the surrounding fuselage and thus such panels may be made thinner (by increasing the number of beams) without sacrificing structural integrity and without significantly increasing the cost of manufacture. In panels constructed according to the invention, the cost of increasing the number of beams is nominal because of the high degree of commonality of the beams. A thinner door has the advantage of being more readily adaptable to different methods of opening, such as sliding up behind the cabin ceiling panels as opposed to swinging outwardly. A thinner door also has the advantage of minimizing the cabin space required to accommodate the door and therefore providing more cabin space for other purposes.

The advantage of being able to make the door thinner is maximized by moving the center line inboard from said compound curvature and allowing the panel to bow under pressurization to conform to said compound curvature. Panels constructed in this manner have an intentional controlled amount of flexibility and therefore do not require the usual stiffening elements that add to the thickness of conventionally constructed aircraft doors. In addition to the advantages of adaptability to various methods of opening and minimal occupation of valuable cabin space, the flexible construction of such panels also has the advantage of further decreasing the cost of manufacture by further decreasing the number of parts required to construct the panel. In panels that have the preferred feature of continuous stop surfaces, the torsional stiffness of the panel and the vertical bending stiffness of the edge members may be kept minimal to allow the door to deflect in all directions so that a positive pressure differential on the inboard side of the panel will create an excellent fit of the continuous stop surfaces with the wall into which the panel is installed. Thus, these minimal stiffnesses tend to automatically correct for manufacturing variations without increasing the cost of manufacture.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of a typical aircraft into which a door constructed according to the invention may be incorporated;

FIG. 2 is a pictorial view of the preferred embodiment of the door of the invention with cabin upholstery and the like omitted to show the construction of the lateral beams and the edge members;

FIG. 3 is a pictorial view of the preferred embodiment of a typical lateral beam, with the center portion of the beam cut away;

FIG. 4 is a sectional view taken substantially along line 4—4 in FIG. 2;

FIG. 5 is a sectional view taken substantially along the line 5—5 in FIG. 2;

FIG. 6 is a sectional view taken substantially along the line 6—6 in FIG. 2;

FIG. 7 is a detailed side view of an end portion of the preferred embodiment of the lateral beams;

FIG. 8 is a sectional view showing the preferred embodiment of the constant cross-sectional shape of each of the edge members;

FIG. 9 is a pictorial view of a portion of the preferred embodiment of each of the right and left edge members;

FIG. 15 is a sectional view of the preferred embodiment of the beam, showing in broken lines the bowed position of the beam under pressurization;

FIG. 16 is a pictorial schematic view of a conventionally constructed aircraft door;

FIG. 17 is a sectional view taken along line 17—17 in FIG. 16;

FIG. 18 is like FIG. 16 except that it shows the preferred embodiment of the door of the invention; and FIG. 19 is a sectional view taken along the line 19—19 in FIG. 18.

BEST MODE FOR CARRYING OUT THE INVENTION

Figure 10:
FIG. 10 is an elevational view of the preferred embodiment of the two edge members showing the twist of such members.

The drawings show a forward door 4 and an aft door 6 that are constructed according to the invention and that also constitute the best mode of the apparatus of the invention currently known to the applicant. FIG. 1 illustrates the anticipated primary use for the method and apparatus of the invention. This anticipated primary use is the provision of improved and relatively inexpensive forward and aft doors 4, 6 in a commercial passenger jet aircraft 2. As is typical in such aircraft, the aircraft 2 shown in FIG. 1 has a forward passenger entry door 4 and an aft passenger entry door 6 located in portions of the fuselage that are compoundly curved.

The door 4, 6 shown in the drawings has an outer skin 12 which, like the outer skins of conventional doors, is constructed to conform to the compound curvature of the fuselage during operation of the aircraft 2. This operational curvature of the door's outer skin 12 has the well-known purpose of maintaining the curvature of the fuselage and therefore the aerodynamic characteristics of the aircraft 2 when the door 4, 6 is closed and the cabin is pressurized at cruise altitude. In the preferred embodiment of the door 4, 6 of the invention, the unpressurized outer skin 12 has a modified flattened contour which is described in more detail below.

A primary aspect of the present invention is the structure and arrangement of the structural members of the door 4, 6 that provide it with the necessary strength to withstand pressure loads. These structural members include right and left edge members 14, 16 and a number of beams 28 extending across the door 6 between the edge members 14, 16. In the door 4, 6 shown in the drawings, the number of transverse beams 28 is fifteen, but of course this number may vary to meet the size and strength requirements of a particular aircraft.

In order to provide a good fit with the opening in the fuselage for the door 4, 6 and to provide continuity in the structure of the fuselage, the right edge member 14 has a longitudinal axis that conforms to the curvature of the fuselage along the right edge of the door 4, 6 and the left edge member 16 has a longitudinal axis that conforms to the fuselage curvature along the left edge of the door 4, 6. (In this description, "conforms to the curvature" and like phrases are intended to mean that the line or axis in question has the same curvature within the tolerance limits of the structure of the aircraft.) The longitudinal axes of the edge members 14, 16 would generally be vertical and be located on station lines of the aircraft 2. The longitudinal axis of each edge member 14, 16 is spaced from the member 14, 16 and is located along the intersection of the edge of the door 4, 6 with the fuselage skin 3 in order to assure a matching of outer skin 12 with the fuselage skin 3. In the drawings, the location of the longitudinal axes of members 14, 16 is shown as reference point 40.

Each of the edge members 14, 16 in the preferred embodiment is a continuous member that extends from the top of the door 4, 6 to its bottom. Along its length, each of the members 14, 16 has an essentially constant cross-sectional shape. Each member 14, 16 also has a mating surface that in the preferred embodiment forms a continuous stop surface for matingly engaging the ends of the beams 28. The drawings show the preferred configuration of the cross-sectional shape of each of the edge members 14, 16. This preferred configuration is stepped to provide a four-part stop surface on each of the members 14, 16. Two parts of the stop surface extend generally parallel to the skin 12 of the door 4, 6 and the other two parts of the stop surface extend generally perpendicular to the skin 12 of the door 4, 6.

Each of the beams 28 extends laterally across the inside of the door 4, 6 between the edge members 14, 16. The left and right ends 36, 34 of each beam 28 have a stepped configuration to mate with the stepped configuration of the edge members 14, 16. In the preferred embodiment, the cross-sectional shape of the two edge members 14, 16 is the same and the right and left ends 34, 36 of each of the beams 28 are essentially identical to mesh with the edge members 14, 16. The right and left ends 34, 36 of each of the beams 28 are secured to the right and left edge members 14, 16, respectively. They may be secured by any of a variety of known means, such as rivets and/or bolts.

One of the major advantages of the method and apparatus of the present invention is that many of the beams 28 may be constructed to be identical (within manufacturing tolerances). The rest of the beams (except the top and bottom beams) are also identical at their left and right ends and only vary in their center portions in order to provide attachments and/or clearances for other structures or features of the door 4, 6. Perhaps the most striking modification required is the center opening in one of the center beams for the window 8 of the door 4, 6. The ends of the top and bottom beams 28 of the door 4, 6 are modified to accommodate the seal 10 around the rim of the door 4, 6. As has been noted above, the high degree of uniformity among the beams 28 provides great cost savings in the manufacture of the door 4, 6.

Since each of the beams 28 is essentially a straight member that extends between two curved members 14, 16 with differing curvatures, it is necessary to provide means for insuring that the ends 34, 36 of the beams 28 mate properly with the edge members 14, 16. The conventional method of providing the correct mating of the ends of the beams is to sacrifice uniformity of the beams by machining each end of each beam to a different angle to provide for the changing angles of the curvature of the edge members 14, 16. The present invention provides a method of making the beams 28 mate properly with the edge members 14, 16 without sacrificing the great advantage of uniformity.

Figure 13:
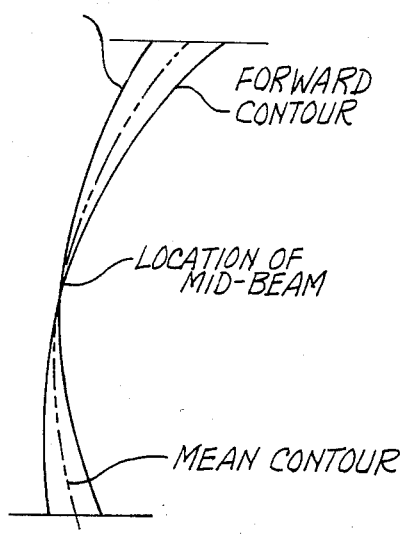
FIG. 13 illustrates the curvatures of the door at its right and left edges and the interpolated mean contour.
Figure 14:
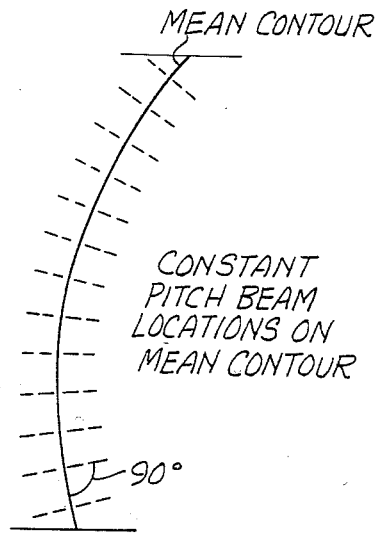
FIG. 14 illustrates the positioning of the lateral beams along the mean contour.

The beams 28 are spaced longitudinally along a center line that is located substantially midway between the edge members 14, 16. In the preferred embodiment the beams 28 are spaced at regular intervals along this center line so that each results the same amount of pressure (See FIG. 14.). The center line itself is preferably a mean contour that is interpolated by well-known means from the longitudinal axes of the right and left edge members 14, 16. The use of a mean contour optimizes the design of the door by providing an optimized approximate line up of the ends 34, 36 of the beams 28 with the edge member longitudinal axes. FIG. 13 illustrates the interpolation of the mean contour. (When the curvature of the fuselage creates an inboard-outboard offset of the forward and aft contours, one of these two contours is shifted in an inboard and outboard direction to intersect the other contour as shown in FIG. 13 before the mean contour is interpolated.)

Each of the beams 28 along the center line is oriented with respect to the center line at a substantially constant predetermined angle. This angle is preferably chosen to be substantially equal to 90°. The preferred embodiment of the beam 28 is essentially a straight member with plane surfaces (except for the surface adjacent to the skin 12 of the forward door 4) and right angles between its surfaces (except for one angle on the forward door 4 as explained below). The longitudinal axis of the beam 28 is a straight line that extends generally horizontal across the door 4, 6 between the outboard portions of the edge members 14, 16. Since the beam 28 has a thickness from its top to its bottom, for convenience the longitudinal axis is assumed to be located at the middle of the beam 28 moving from top to bottom. The longitudinal axis of beam 28 is in the line that forms an angle of 90° with the center line. More precisely stated, the longitudinal axis of the beam 28 forms an angle of 90° with the tangent to the center line at the point where the center line crosses such longitudinal axis.

The lining up of the beams 28 along the center line provides an approximate lining up of the ends 34, 36 of the beams 28 with the longitudinal axes of the edge members 14, 16. In order to bring the stepped mating surfaces of each of the edge members 14, 16 into mating engagement with the ends 34, 36 of the beams 28, each edge member 14, 16 is twisted about its respective longitudinal axis. In a typical door constructed according to the invention, the magnitude of the twist would be in the range of about 1° to 2° at the top or bottom with a zero twisting point at the center of the edge member.

Figure 11:
FIG. 11 is an elevational view of the edge members of a hypothetical conventional aircraft door with continuous stop surfaces.
Figure 12:
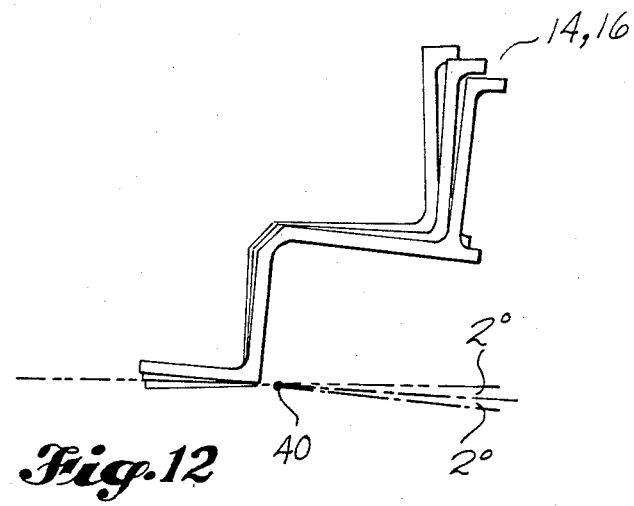
FIG. 12 illustrates the relative positions of the cross sections of the edge members at the top, middle, and bottom of the door shown in FIG. 2.

FIGS. 4–6 are horizontal sectional views of the door 4, 6 showing the relative orientations of the top, middle, and bottom beams 28, respectively. The line $C_L$ in FIGS. 4–6 is the center line of the door 4, 6, which coincides with the center line of the middle beam. FIG. 10 shows the twisting of the edge members 14, 16. The twist has been exaggerated for purposes of illustration. FIG. 11 illustrates the untwisted configuration of the vertical edge members of a conventional door. FIG. 12 shows the relative angular positions of the cross sections of each edge member 14, 16 of the preferred embodiment at the locations where the top, middle, and bottom beams 28 matingly engage the edge members 14, 16.

The lining up of the beams 28 along the center line to be perpendicular to the center line and the central location of the center line allow the beams to be positioned substantially symmetrically about the center line. Such a symmetrical arrangement optimizes the advantages of the structure of the invention. Since the center line is a mean contour, an optimized approximation of the ends 34, 36 of the symmetrical beam 28 with each of the longitudinal axes of the edge members 14, 16 is attained. Moreover as noted above, the use of right and left symmetrical beams has the advantage of making it possible for two doors located on the right and left sides of the aircraft to have many parts in common.

The details of the construction of the beams 28 may of course vary, but the preferred construction is shown in the drawings. In the preferred construction the center part of the beam 28 has a generally U-shaped configuration and the laterally directed ends 34, 36 of the beam 28 are stepped with portions essentially parallel to the longitudinal axis of the beam 28 and portions essentially perpendicular to said axis. Therefore, the longitudinal axis of each beam 28 is substantially perpendicular to those side portions of the mating surfaces of the edge members 14, 16 that extend generally perpendicular to the skin 12. The webbing 30 at the ends of the beams 28 provides additional strength at the ends without substantially increasing their weight.

One of the major reasons for choosing a stepped configuration for the mating surfaces of the edge members 14, 16 is that such a configuration, in combination with the construction of each member 14, 16 as a continuous member, provides a very good pressure reacting and sealing arrangement for the door 4, 6. The seal 10 of the door 4, 6 extends around the perimeter of the door 4, 6 and runs along the sides of the door 4, 6, within passageways 11 formed by the outer stepped surfaces of the edge members 14, 16. The seal 10 provides the sealing engagement of the door 4, 6 with the fuselage.

The edge members 14, 16 are spaced laterally from the edges of the opening in the fuselage into which the door 4, 6 is installed. The spacing helps to accommodate any deviation in the longitudinal axes of the edge members 14, 16 from the curvature of the fuselage and also provides an important safety feature. In the event of a crash, the spacing of the door 4, 6 from the edges of the fuselage is designed to allow the door 4, 6 to still be opened even if the fuselage has been deformed by the crash. Such a safety precaution is well-known in the art.

As noted above, in the preferred embodiment of the door 4, 6 the unpressurized outer skin 12 has a modified flattened contour. To give the door 4, 6 and outer skin 12 this modified contour, the center reference line is positioned slightly inboard of the compound curvature of the fuselage. The magnitude of the inboard displacement of the center line in the preferred embodiment shown in the drawings is approximately 0.15 to 0.20 inches. In accordance with the invention, the door 4, 6 is designed to have a controlled horizontal flexibility that allows a controlled amount of horizontal deflection of the door 4, 6. This controlled flexibility causes the door 4, 6 to deflect in an outboard direction when the cabin of the aircraft 2 is pressurized so that the modified contour of the outer skin 12 will deflect into the operational curvature of the door 4, 6 which conforms to the compound curvature of the fuselage. The controlled deflection is provided by making the beams 28 sufficiently flexible so that the higher pressure on the inboard side of the door 4, 6 created by cabin pressurization will tend to bow each of the beams 28 and the door 4, 6 to conform to said compound curvature of the fuselage. In the preferred embodiment, the flexibility of the beams 28 is controlled by varying the horizontal (inboard to outboard) depth of the beams 28 and by varying the thickness of the inboard flange of the beams 28. To control the deflection of the beams 28, the inboard flange 32 of each beam 28 is thicker at its center than at its ends.

When it is possible, it is of course desirable to construct the beams 28 with all plane surfaces and all right angles between its surfaces. This may be accomplished when the degree of curvature of the fuselage is sufficiently small so that the amount of deflection required between a flat surface and the curvature is sufficiently small to be practically achievable. In the aircraft 2 shown in the drawings, the curvature of the fuselage at the location of the aft door 6 is within these limits. Therefore, in the preferred embodiment of the aft door 6 all of the surfaces of the beams 28 are essentially planar and all of the angles on the ends of the beam 28 are right angles. This construction helps to minimize the cost of manufacture of the beams 28.

In the aircraft 2 shown in the drawings, the curvature of the fuselage is more severe at the location of the forward door 4 and therefore the surfaces of the beams 28 that are adjacent to and attached to the outer skin 12 have a slightly curved configuration. This curved configuration is, however, flattened in comparison to the curvature of the fuselage. As is the case with the beams in the aft door 6, the beams 28 in the forward door 4 are designed to deflect when the cabin is pressurized, as described above.

Since the outboard surface 29 of each beam 28 in forward door 4 is slightly curved, the angle between surface 29 and the adjacent end surface of the beam 28 is not quite equal to 90 degrees. In the embodiment shown in the drawings, the angle is equal to approximately 91 degrees and the corresponding angle on the edge members 14, 16 (the angle nearest reference point 20) with which this angle meshes is also equal to approximately 91 degrees.

FIGS. 16 and 17 illustrate a conventionally constructed aircraft door that is fabricated with the curvature of the fuselage and that is designed to be very rigid to resist any outboard deflection due to cabin pressurization. The conventional door shown in FIGS. 16 and 17 has a grid-like structure with several horizontal cross beams and several vertical beams. The door is also provided with an inner skin (not shown in the drawings) to further increase the rigidity of the structure. As can be clearly seen in FIG. 16, the conventionally constructed door is relatively thick in the inboard-outboard direction. FIG. 17 illustrates a cross section of the door shown in FIG. 16 with the outer skin of the door shown conforming to the broken line which represents the curvature of the fuselage.

In comparison, FIG. 18 shows the simplified, relatively thin structure of the preferred embodiment of the door of the present invention. This door 4, 6 has a relatively large number of cross beams 28 and just two vertical members—the two edge members 14, 16. The door 4, 6 is not provided with an inner skin since it does not require the rigidity that such a skin would provide. The door 4, 6 has a controlled horizontal stiffness to provide controlled horizontal deflection, described above, and minimal vertical and torsional stiffness. These minimal stiffnesses allow the edge members 14, 16 to bend to bring the continuous stop surfaces of edge members 14, 16 into a good fit with the edges of the fuselage. This bending improves the sealing engagement between the door 4, 6 and the fuselage and helps to automatically correct for any manufacturing variations in the construction of the door 4, 6 and/or the fuselage.

FIG. 19 is a schematic representation of a cross section of the door 4, 6 as shown in FIG. 18 showing the modified flattened contour of the outer skin 12 in comparison with the compound curvature of the fuselage represented by the broken line. FIG. 15 is a sectional view of the preferred embodiment of the beam 28 showing in solid lines the unpressurized configuration of the beam 28 and in broken lines the deflected pressurized configuration of the beam 28 which conforms to the fuselage curvature.

The process of making a movable panel constructed according to the invention begins with the selection of a center reference line. As discussed above, this center reference line is preferably a mean contour that is interpolated from the curvatures at the lateral edges of the opening for the panel and also is preferably positioned to be slightly inboard of the fuselage curvature. Once the reference line is determined, a plurality of beams 28 with essentially identical end portions 34, 36 are positioned along the line. The beams 28 are preferably positioned at regular intervals along the line with their longitudinal, laterally-extending, axes oriented to be perpendicular to the reference line.

The design of the edge members 14, 16 begins with longitudinal axes that conform to the compound curvature of the aircraft fuselage at the edges of the opening for the panel in order to provide the panel with conforming curvature along its lateral edges. The edge members 14, 16 are provided with a constant cross-sectional shape. This shape preferably has the stepped configuration shown in the drawings.

The design of the edge members 14, 16 is initially lined up so that the center beam 28 will be perpendicular to the stepped mating surfaces of the edge members 14, 16 and the ends of the center beam 28 will matingly engage the stepped mating surfaces of the edge members 14, 16. Then by well known computer programming methods the locations of the reference points 18, 20, 22, 24, 26 on the edge members 14, 16 (See FIG. 8) is determined for each position on each mating surface where an end of a beam 28 will engage the member 14, 16. The three dimensional plotting of these reference points is then used to determine the amount of twist required at each position along the edge members 14, 16 and the exact configuration of each member 14, 16. Plotting the reference points 18, 20, 22, 24, 26 on the edge members 14, 16 while keeping the longitudinal axes constant has the effect of twisting the edge members 14, 16 about their respective longitudinal axes. Once the exact shape of each member 14, 16 has been determined, the edge members 14, 16 are formed and machined to attain the desired configuration. It should be noted that there is no need to machine the twist onto the end surfaces 34, 36 of the beams 28 that engage the edge members 14, 16 because the amount of twist over each such end surface is too small to have any significance and, in fact, too small to be practically machinable. When the panel is assembled, the ends 34, 36 of the beams 28 are secured to the edge members 14, 16 and the outboard flange 29 of each beam 28 is secured to the outer skin 12.

Throughout the description of the apparatus and method of the preferred embodiment of this invention, the edge members have been described as being generally vertical and the beams as being generally horizontal. This orientation has been described for illustrative purposes only, illustrating the usual configuration of a passenger entry door in a commercial passenger jet aircraft. The description of this orientation is not intended to indicate that the apparatus and method of the present invention is limited to the illustrated orientation, and it is intended to be understood that panels constructed according to the invention may be oriented in other attitudes without departing from the spirit and scope of the invention.

It will be obvious to those skilled in the art to which this invention is addressed that the invention may be used to advantage in a variety of situations. Therefore it is also to be understood by those skilled in the art that various changes, modifications, and omissions in the form and detail may be made without departing from the spirit and scope of the present invention as defined by the following claims.

What is claimed is:

1. For use in a wall of an aircraft, said wall having an outer surface with a compound curvature, a movable panel comprising:
    right edge member means having a longitudinal axis that conforms to said curvature along the right edge of the panel and including right mating surface means with an essentially constant cross-sectional shape;
    left edge member means having a longitudinal axis that conforms to said curvature along the left edge of the panel and including left mating surface means with an essentially constant cross-sectional shape;
    a plurality of spaced-apart lateral beams, each of which has a right end portion, a left end portion, and a center portion; and
    means for securing each right end portion to the right edge member means and each left end portion to the left edge member means;
    wherein each of said right end portions is essentially identical, each of said left end portions is essentially identical, and each of said center portions is oriented at a substantially constant predetermined angle with respect to a center line located substantially midway between said right and left edge member means; and
    wherein each of said right and left edge member means has a configuration that is twisted about its respective longitudinal axis, to position said right and left mating surface means so that they will be in mating engagement with each of said right and left end portions, respectively, in the assembled panel.

2. A movable panel as described in claim 1, in which said center line is a mean contour interpolated from the longitudinal axes of said right and left edge member means.

3. A movable panel as described in claim 1, in which said beams are substantially symmetrical about said center line.

4. A movable panel as described in claim 1, in which said predetermined angle is substantially equal to 90 degrees.

5. A movable panel as described in claim 3, in which said predetermined angle is substantially equal to 90 degrees.

6. A movable panel as described in claim 5, in which the laterally extending longitudinal axis of each beam is substantially perpendicular to a side portion of each mating surface means, said side portion being in mating engagement with the corresponding end portion of such beam.

7. A movable panel as described in claim 1, in which the right mating surface means comprises a continuous stop surface that matingly engages each of said right end portions, and the left mating surface means comprises a continuous stop surface that matingly engages each of said left end portions.

8. A movable panel as described in claim 7, in which the cross-sectional shape of the right mating surface means has a stepped configuration to mate with a corresponding stepped configuration of each of said right end portions, and the cross-sectional shape of the left mating surface means has a stepped configuration to mate with a corresponding stepped configuration of each of said left end portions.

9. A movable panel as described in claim 7, in which said beams are substantially symmetrical about said center line, and the cross-sectional shape of each of the right and left mating surface means has a stepped configuration to mate with a corresponding stepped configuration of each of said right and left end portions, respectively; and in which the stepped configuration of said end portions has portions essentially parallel to the longitudinal axis of the corresponding beam and portions essentially perpendicular to said axis of said beam.

10. For use in a wall of an aircraft, said wall having an outer surface with a compound curvature, a movable panel comprising:
right edge member means having a longitudinal axis that conforms to said curvature along the right edge of the panel and including right mating surface means with an essentially constant cross-sectional shape;
left edge member means having a longitudinal axis that conforms to said curvature along the left edge of the panel and including left mating surface means with an essentially constant cross-sectional shape;
a plurality of spaced-apart lateral beams, each of which has a right end portion, a left end portion, and a center portion; and
means for securing each right end portion to the right edge member means and each left end portion to the left edge member means;
wherein each of said right end portions is essentially identical, each of said left end portions is essentially identical, and each of said center portions is oriented at a substantially constant predetermined angle with respect to a center line located substantially midway between said right and left edge member means;
wherein said center line is positioned slightly inboard of said compound curvature to give the panel a modified, flattened outboard contour with respect to said compound curvature; and the beams are sufficiently flexible so that a higher pressure on the inboard side of the panel than on the outboard side of the panel tends to bow the panel to conform said outboard contour to said compound curvature; and
wherein said right and left edge member means are twisted about their respective longitudinal axes to bring said right and left mating surface means into mating engagement with each of said right and left end portions, respectively.

11. A movable panel as described in claim 10, in which said center line is a mean contour interpolated from the longitudinal axes of said right and left edge member means.

12. A movable panel as described in claim 10, in which the right mating surface means comprises a continuous stop surface that matingly engages each of said right end portions, and the left mating surface means comprises a continuous stop surface that matingly engages each of said left end portions.

13. A movable panel as described in claim 10, in which said beams are substantially symmetrical about said center line.

14. A movable panel as described in claim 12, in which the cross-sectional shape of the right mating surface means has a stepped configuration to mate with a corresponding stepped configuration of each of said right end portions, and the cross-sectional shape of the left mating surface means has a stepped configuration to mate with a corresponding stepped configuration of each of said left end portions.

15. For use in a wall of an aircraft, said wall having an outer surface with a compound curvature, a movable panel comprising:
an outer skin;
right edge member means having a longitudinal axis that conforms to said curvature along the right edge of the panel and including right mating surface means with an essentially constant cross-sectional shape;
left edge member means having a longitudinal axis that conforms to said curvature along the left edge of the panel and including left mating surface means with an essentially constant cross-sectional shape;
a plurality of spaced-apared lateral beams; each of which has a right end portion, a left end portion, and a center portion; and each of which has an outboard surface that is adjacent to and attached to the outer skin; and
means for securing each right end portion to the right edge member means and each left end portion to the left edge member means;
wherein each of said right end portions is essentially identical, each of said left end portions is essentially identical, and each of said center portions is oriented at a substantially constant predetermined angle with respect to a center line located substantially midway between said right and left edge member means;
wherein said center line is positioned slightly inboard of said compound curvature to give the panel a modified flattened contour with respect to said compound curvature; and the beams and the outer skin are sufficiently flexible so that a higher pressure on the inboard beam side of the outer skin than on the opposite side of said skin tends to bow each beam and the outer skin to conform said skin and said outboard surfaces of the beams to said compound curvature; and
wherein said right and left edge member means are twisted about their respective longitudinal axes to bring said right and left mating surface means into mating engagement with each of said right and left end portions, respectively.

16. A movable panel as described in claim 15, in which said outboard surfaces of the beams are essentially flat when the pressures on the beam side and the opposite side of the outer skin are substantially equal.

17. A movable panel as described in claim 16, in which said beams are substantially symmetrical about said center line.

18. A movable panel as described in claim 16, in which the right mating surface means comprises a continuous stop surface that matingly engages each of said right end portions, and the left mating surface means comprises a continuous stop surface that matingly engages each of said left end portions.

19. A movable panel as described in claim 18, in which the cross-sectional shape of the right mating surface means has a stepped configuration to mate with a corresponding stepped configuration of each of said right end portions, and the cross-sectional shape of the left mating surface means has a stepped configuration to mate with a corresponding stepped configuration of each of said left end portions.

20. For use in a wall of an aircraft, said wall having an outer surface with a compound curvature, a movable panel comprising:
 right edge member means having a longitudinal axis that conforms to said curvature along the right edge of the panel;
 left edge member means having a longitudinal axis that conforms to said curvature along the left edge of the panel;
 a plurality of spaced-apart lateral beams, each of which has a right end portion, a left end portion, and a center portion; and
 means for securing each right end portion to the right edge member means and each left end portion to the left edge member means;
 wherein each of said center portions is oriented at a substantially constant predetermined angle with respect to a center line located substantially midway between said right and left edge member means; and
 wherein said center line is positioned slightly inboard of said compound curvature to give the panel a modified, flattened outboard contour with respect to said compound curvature; and the beams are sufficiently flexible so that a higher pressure on the inboard side of the panel than on the outboard side of the panel tends to bow the panel to conform said outboard contour to said compound curvature.

21. A movable panel as described in claim 20, in which said center line is a mean contour interpolated from the longitudinal axes of said right and left edge member means.

22. A movable panel as described in claim 20, in which said predetermined angle is substantially equal to 90 degrees.

23. A movable panel as described in claim 20, in which the right and left edge member means each includes a continuous stop surface that matingly engages each of said right and left end portions, respectively.

24. A movable panel as described in claim 20, which further comprises an outer skin; in which an essentially flat outboard surface of each beam is adjacent to and attached to the outer skin; and in which said higher pressure tends to bow each beam and the outer skin to conform said skin and said outboard surfaces of the beams to said compound curvature.

25. A movable panel as described in claim 20, in which said beams are substantially symmetrical about said center line.

26. A movable panel as described in claim 23, in which the continuous stop surface of the right edge member means has a stepped configuration to mate with a corresponding stepped configuration of each of said right end portions, and the continuous stop surface of the left edge member means has a stepped configuration to mate with a corresponding stepped configuration of each of said left end portions.

27. A method of making a movable panel to be installed in an opening in a wall of an aircraft, said wall having a compound curvature, comprising:
 selecting a center reference line;
 positioning a plurality of beams with substantially identical end portions in a spaced-apart relation along said reference line and orienting the longitudinal axes of said beams to form a substantially constant angle with said line;
 forming edge members to have mating surfaces with substantially constant cross-sectional shapes, to have longitudinal axes that conform to said compound curvature along the lateral edges of said opening, and to have configurations that are twisted about their respective longitudinal axes to cause the mating surfaces to be positioned to matingly engage opposite end portions of each of the beams; and
 securing said opposite end portions to said edge members.

28. A method as described in claim 27, in which the step of selecting a center reference line comprises interpolating a mean contour from the curvatures at the lateral edges of said opening.

29. A method as described in claim 27, in which the step of positioning and orienting said beams includes orienting their longitudinal axes to be substantially perpendicular to said line.

30. A method as described in claim 27:
 in which the step of selecting a center reference line includes positioning said line slightly inboard of said compound curvature to give the panel a modified, flattened outboard contour with respect to said compound curvature; and
 which further comprises allowing the beams to deflect an amount sufficient to bow the panel to conform said outboard contour to said compound curvature when there is a higher pressure on the inboard side of the panel than on the outboard side of the panel.

31. A method of making a movable panel to be installed in an opening in a wall of an aircraft, said wall having a compound curvature, comprising:
 selecting a center reference line, and positioning said line slightly inboard of said compound curvature to give the panel a modified, flattened outboard contour with respect to said compound curvature;
 positioning a plurality of beams in a spaced-apart relation along said reference line and orienting the longitudinal axes of said beams to form a substantially constant angle with said line;
 forming edge members to have longitudinal axes that conform to said compound curvature along the lateral edges of said opening;
 securing opposite end portions of each of the beams to said edge members; and
 allowing the beams to deflect an amount sufficient to bow the panel to conform said outboard contour to said compound curvature when there is a higher pressure on the inboard side of the panel than on the outboard side of the panel.

* * * * *

UNITED STATES PATENT AND TRADEMARK OFFICE
CERTIFICATE OF CORRECTION

PATENT NO. : 4,557,440
DATED : December 10, 1985
INVENTOR(S) : Ronald Adams

It is certified that error appears in the above-identified patent and that said Letters Patent are hereby corrected as shown below:

Column 7, line 62, "results" should be -- resists --.

Column 8, line 5, "and" should be -- or --.

Column 8, line 17, "horizontal" should be -- horizontally --.

Column 14, line 23, "spaced-apared" should be -- spaced-apart --.

Signed and Sealed this

Seventeenth Day of June 1986

[SEAL]

Attest:

DONALD J. QUIGG

Attesting Officer

Commissioner of Patents and Trademarks